(12) United States Patent
Des Champs

(10) Patent No.: US 10,775,073 B2
(45) Date of Patent: Sep. 15, 2020

(54) SYSTEMS, DEVICES, AND/OR METHODS FOR MANAGING CONDENSATE

(71) Applicant: Nicholas Howard Des Champs, Fincastle, VA (US)

(72) Inventor: Nicholas Howard Des Champs, Fincastle, VA (US)

( * ) Notice: Subject to any disclaimer, the term of this patent is extended or adjusted under 35 U.S.C. 154(b) by 119 days.

(21) Appl. No.: 16/312,514

(22) PCT Filed: Aug. 14, 2016

(86) PCT No.: PCT/US2016/046949
§ 371 (c)(1),
(2) Date: Dec. 21, 2018

(87) PCT Pub. No.: WO2018/034636
PCT Pub. Date: Feb. 22, 2018

(65) Prior Publication Data
US 2019/0226715 A1 Jul. 25, 2019

(51) Int. Cl.
| | | |
|---|---|---|
| *F25B 43/04* | (2006.01) | |
| *F24F 13/22* | (2006.01) | |
| *F28F 17/00* | (2006.01) | |
| *F16T 1/38* | (2006.01) | |
| *F16T 1/22* | (2006.01) | |
| *F16T 1/20* | (2006.01) | |

(52) U.S. Cl.
CPC .............. *F24F 13/222* (2013.01); *F16T 1/20* (2013.01); *F16T 1/22* (2013.01); *F16T 1/383* (2013.01); *F25B 43/04* (2013.01); *F28F 17/005* (2013.01); *F24F 2013/227* (2013.01); *F25D 2321/146* (2013.01); *F28F 2265/18* (2013.01)

(58) Field of Classification Search
CPC ... F24F 13/222; F24F 2013/227; F25B 43/04; F25D 2321/146; F28F 17/005; F28F 2265/18
See application file for complete search history.

(56) References Cited

U.S. PATENT DOCUMENTS

| | | | |
|---|---|---|---|
| 4,742,842 A | 5/1988 | Garneau | |
| 5,201,340 A * | 4/1993 | Teepe | B65D 88/747 137/315.01 |
| 5,348,041 A * | 9/1994 | Clark | B01D 17/0208 137/172 |
| 5,797,426 A * | 8/1998 | Powell | F16K 15/04 137/433 |
| 10,603,605 B1 * | 3/2020 | Mills | B01D 17/12 |
| 2003/0037561 A1 | 2/2003 | Chaves | |
| 2008/0099083 A1 | 5/2008 | Nishimoto | |
| 2009/0229539 A1 | 9/2009 | Young | |
| 2013/0306163 A1 | 11/2013 | Hubbard | |

FOREIGN PATENT DOCUMENTS

| | | |
|---|---|---|
| DE | 827066 | 1/1952 |
| GB | 2479772 | 10/2011 |

* cited by examiner

*Primary Examiner* — Filip Zec
(74) *Attorney, Agent, or Firm* — Michael Haynes PLC; Michael N. Haynes

(57) ABSTRACT

Certain exemplary embodiments can provide a system, machine, device, and/or manufacture that is configured for operably releasing condensate from a condensate producing system to a drain without allowing a substantial quantity of air to enter the condensate producing system from the drain or a substantial quantity of air to exit the condensate producing system to the drain.

12 Claims, 6 Drawing Sheets

SYSTEMS, DEVICES, AND/OR METHODS FOR MANAGING CONDENSATE

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Certain exemplary embodiments relate to the technical field of heating, ventilating, and air conditioning, or "HVAC". Certain exemplary embodiments are in the technical field of "traps" that allow condensate to drain from a condensate source, such as piece of HVAC, ice-making, dehumidifying, and/or other condensate-producing equipment, and simultaneously prevent air from entering or escaping from the equipment.

As an example—certain exemplary embodiments are in the technical field associated with a rooftop air-handling unit that has a cooling coil to cool air going to and/or within a building. Note that as used herein, "air" need not be pure air, but instead can be or include vapors, liquids, and/or solids, etc., other than pure air, such as smoke, steam, refrigerant, dust, etc. During warm periods, the cooling coil can generate condensate (which herein will often be referred to as "water", although the condensate need not be water, and any water need not be pure (e.g., it can contain a refrigerant, dust, and/or debris, etc.)). More particularly, certain exemplary embodiments are in the technical field of a condensate drainage system that allows removal of water from a condensate-producing unit while simultaneously preventing passage of air to or from the unit.

Certain exemplary embodiments, a device, referred to herein as an "air trap", can use pressure generated by the air moving device(s) within an HVAC unit to prevent unwanted airflow in or out of the HVAC unit via the condensate drain lines. That is, an air trap can use air pressure to "trap" airflow.

That is, certain exemplary embodiments need not require standing water to prevent air from entering and/or leaving a condensate-producing unit. With the occurrence of condensate within the unit, the condensate can flow out of the unit toward the trap but without escape and/or entry of a substantial quantity/volume/flow of air from/to the unit. When there is no condensate produced, there can be essentially no liquid remaining in the trap yet there can be substantially no air flowing through the trap to or from the unit.

Figure 1:
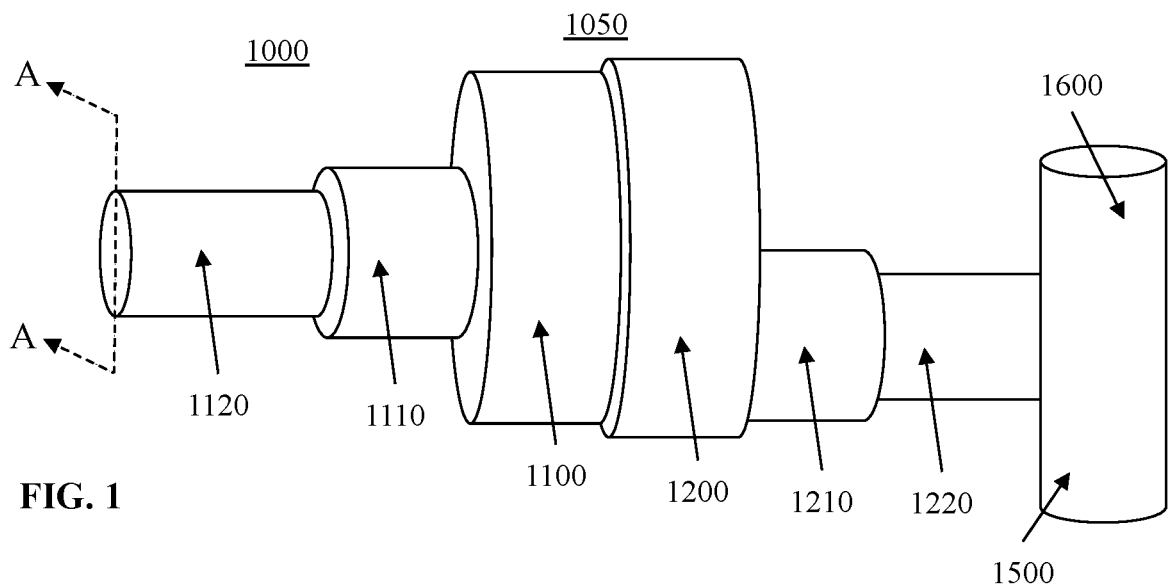
FIG. 1 is a perspective view of an exemplary embodiment of a system.

FIG. 1 illustrates a perspective view of an exemplary embodiment of an air trap 1000 in a substantially horizontal orientation. As illustrated, air trap 1000 can comprise a trap body 1050 that can comprise a seating portion 1100 and a port portion 1200 that is attached to, or integral with, seating portion 1100. A seating pipe mating portion 1110 can be comprised by, attached to, or integral with, seating portion 1100, and/or can be configured to couple with a seating pipe 1120. A seating pipe mating portion 1110 can be comprised by, attached to, or integral with, seating portion 1100. Port portion 1200 can comprise, by attached to, or be integral with a port pipe mating portion 1210 that is configured to couple with a port pipe 1220 (which in this context can be a pipe, nipple, and/or fitting (e.g., bushing, union, coupling, etc.) having a male portion and/or a female portion that can insert into, be inserted into, attach to, and/or mate with port pipe mating portion 1210). As illustrated, with this exemplary embodiment of air trap 1000, condensate can flow into air trap 1000, trap body 1050, seating pipe mating portion 1110, seating pipe 1120, in a substantially horizontal direction.

Figure 2:
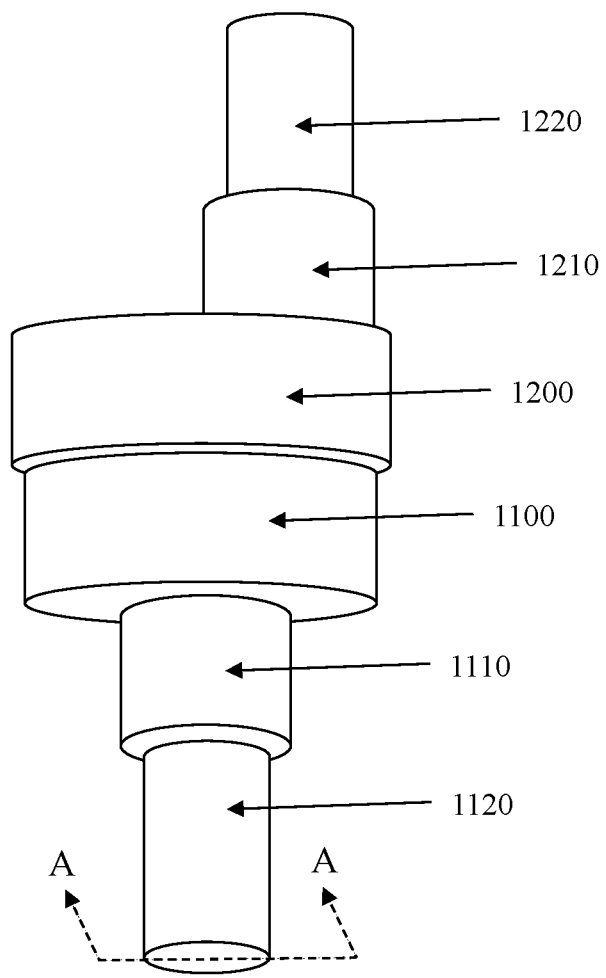
FIG. 2 is a perspective view of an exemplary embodiment of a system.

FIG. 2 illustrates a perspective view of an exemplary embodiment of air trap 1000 rotated from the substantially horizontal orientation of FIG. 1 to a substantially vertical orientation, such that condensate can flow into air trap 1000, trap body 1050, port pipe mating portion 1210, and/or port pipe 1220 in a substantially vertical direction.

Figure 3:
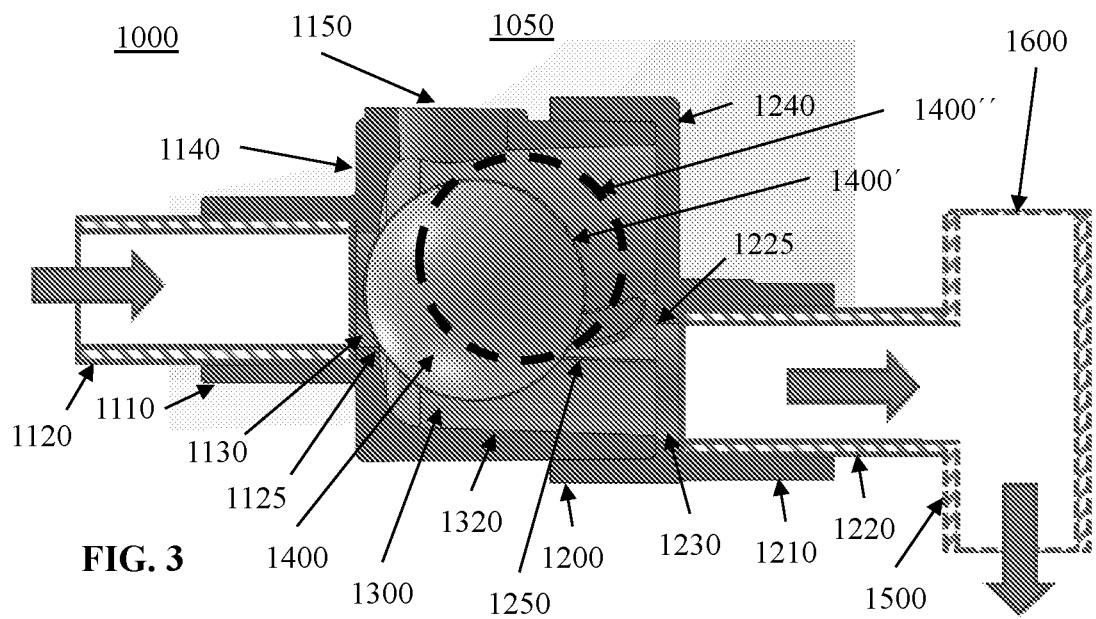
FIG. 3 is a cross-sectional view of an exemplary embodiment of a system.
Figure 4:
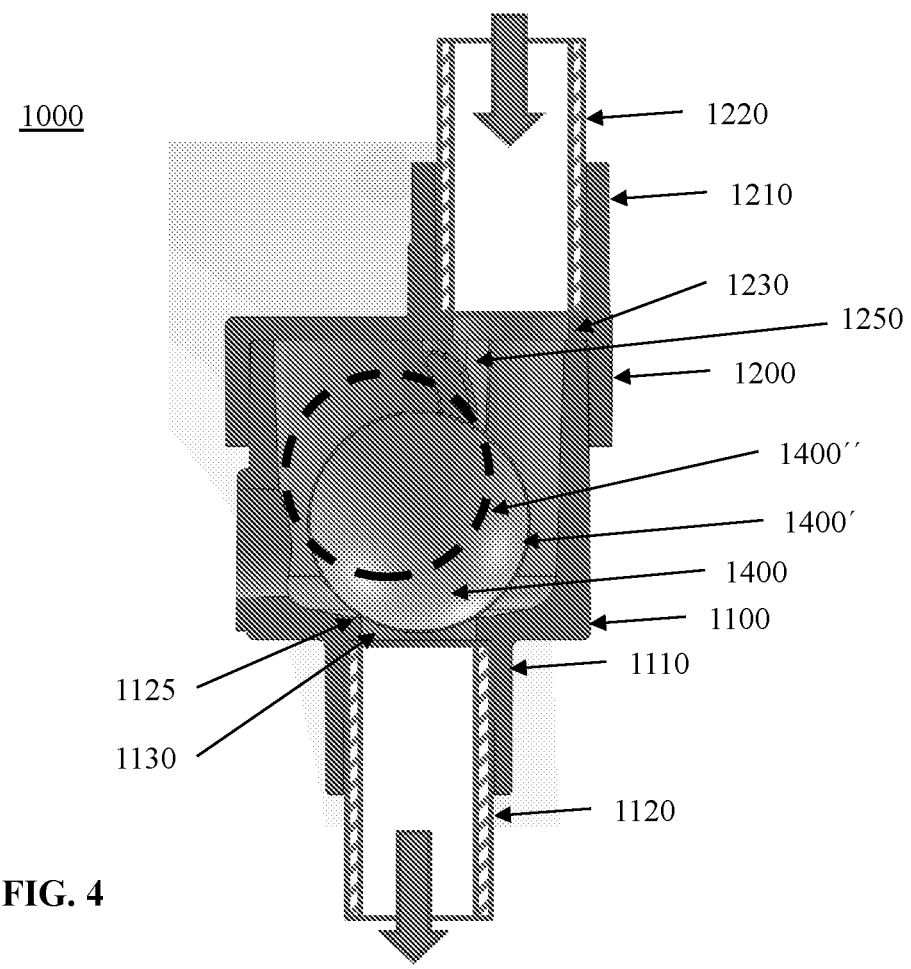
FIG. 4 is a cross-sectional view of an exemplary embodiment of a system.

FIG. 3 illustrates a cross-sectional view of an exemplary embodiment of air trap 1000 taken at section A-A of FIG. 1, and FIG. 4 illustrates the same cross-sectional view but rotated to a substantially vertical orientation, each figure having large arrows showing the normal flow of condensate into and out of the air trap for the corresponding orientation. As illustrated in FIGS. 3 and 4, air trap 1000 can comprise a substantially cup-shaped seating portion 1100 that can be integral with and/or can non-destructively releaseably or destructively attach to, mate with, and/or be received by substantially cup-shaped open port portion 1200. Seating portion 1100 can comprise a seating pipe mating portion 1110 that is configured to mate with a seating pipe 1120, via an arrangement that can be female-male, threaded, force fit, sliding fit, soldered, brazed, welded, and/or solvent-welded, etc. Seating portion 1100 can define a seating aperture or passage 1130. A stationary, substantially smooth, and/or substantially annular zone, oval, and/or circle that can function as a valve "seat" 1125 can be located substantially on, at, between, and/or by a chamber-facing seating wall surface 1140 and seating passage 1130. Seat 1125 and/or seating passage 1130 can have a substantially oval or circular cross-section and/or a diameter selected to substantially match an internal diameter of seating pipe 1120, thereby preventing a substantial amount of water from standing in seating pipe 1120, where seating pipe 1120 inserts into seating pipe mating portion 1110, or within seating passage 1130.

Port portion 1200 can comprise port pipe mating portion 1210 that is configured to mate with a port pipe 1220, via an arrangement that can be female-male, threaded, force fit, sliding fit, soldered, brazed, welded, and/or solvent-welded, etc. Port portion 1200 can define a port 1225 that can: penetrate a chamber-facing wall surface 1240 of port portion 1200; serve as an opening to port passage 1230; have a substantially oval or circular cross-section; and/or have a diameter selected to substantially match an internal diameter of port pipe 1220; thereby preventing a substantial amount of water from standing within port passage 1230, port pipe mating portion 1210, and/or port pipe 1220 where port pipe 1220 inserts into port pipe mating portion 1210.

Seating portion 1100 can mate with port portion 1200, via an arrangement that can be female-male, threaded, force fit, sliding fit, soldered, brazed, welded, and/or solvent-welded, etc., to form or define a chamber 1300 that is configured to contain a float or spherical ball 1400, which can be hollow. Ball 1400 can be configured as a valve whose exterior surface can seat against seat 1125 to form a fluidic seal that can substantially prevent air from flowing from chamber 1300 through seat 1120 and/or into seating pipe 1120 when air trap 1000 is an a substantially horizontal orientation, yet allow condensate to flow from chamber 1300 through port 1225 and/or port passage 1230 and into port pipe 1220. Ball 1400 can be configured as a valve whose exterior surface can seat against seat 1125 to form a fluidic seal that can substantially prevent air from flowing from seating pipe 1120 through seat 1130 and/or into chamber 1300 when air trap 1000 is an a substantially vertical orientation, yet allow condensate to flow from chamber 1300 through seat 1130 and into seat pipe 1120. Thus, in either orientation, the trap 1000 can be configured to substantially drain all condensate from chamber 1300 once flow of the condensate into chamber 1300 has ceased.

Seating pipe 1120 and/or port pipe 1220 can be of any desired nominal diameter, such as for example 0.375 inches, 0.5 inches, 0.75 inches, 1 inch, 1.25 inches, 1.5 inches, 2 inches, 3 inches, 4 inches, 6 inches, etc. Depending on the orientation of air trap 1000, either seating pipe 1120 or port pipe 1220 can be integral to or coupled to a drain pipe 1500 configured to receive the condensate generated by the condensate source. Seating pipe 1120 and/or port pipe 1220 can be of any operable length. Air trap 1000, seating pipe 1120, port pipe 1220, and/or drain pipe 1500 can include, be attached to, and/or be integral with a substantially vertically extending vent 1600 that can function as a vacuum breaker to prevent syphoning and/or back-flow of the condensate from drain pipe 1500.

During operation, there can be a need for air trap 1000 to pass debris, such as dirt, pollen, sand, etc., as well as water. Air trap 1000 can provide an adequate internal flow area to allow these materials to pass freely therethrough. Seating portion 1100 can comprise, be attached to, or have an integral non-destructively openable and re-closeable clean-out portion 1150, which potentially can have a threaded clean-out port and a correspondingly threaded plug that can attach to, mate with, and/or close that clean-out port. Removing the plug to open the clean-out port can allow a fluid, such as pressurized water, air, etc. to be applied to air trap 1000 to blow and/or flow water and/or debris out of air trap 1000 without removing air trap 1000 from the drain piping (which can include seating pipe 1120 and/or port pipe 1220) or otherwise disturbing that piping.

The diameter and/or cross-sectional dimension of seating passage 1130 and/or port passage 1230 can be selected to provide for sufficient flow capacity through air trap 1000 and/or can avoid restricting flow to the point that water builds up over the top of ball 1400 such that ball 1400, during its cycling process, bottoms against seat 1125 and does not leave because of the added pressure buildup resulting from the water height above the top of ball 1400.

Port portion 1200 can define a port wall 1240, from which can protrude one or more guide rails 1250 that are configured to guide ball 1400 away from port 1225 (as ball 1400 is shown in position 1400") and/or to prevent ball 1400 from seating against port 1225 when condensate is flowing, and/or to direct ball 1400 toward, to, and/or against seat 1125 (as ball 1400 is shown in position 1400') when no condensate is flowing and/or substantially no water remains in chamber 1300. Thus in the horizontal orientation when condensate is not entering air trap 1000, and/or when a partial vacuum and/or a negative differential pressure exists between seating pipe 1120 and port pipe 1220, then ball 1400, with the aid of guide rails 1300, will essentially seat itself by floating and/or being pulled into position 1400' against seat 1125.

Seating portion 1100 and/or port portion 1200 can define an approximately cylindrical chamber wall 1320 whose inner surface can be sloped, when air trap 1000 is in a substantially horizontal orientation, to encourage water within chamber 1300 to move toward port wall 1240. Seating portion 1100, port portion 1200, and/or chamber 1300 can be configured to allow sufficient flow area between ball 1400 and the inner surface of chamber wall 1320 to allow both water and debris to pass freely through air trap 1000. When water is flowing, the guide rails 1250 are designed such that the position of the ball 1400 is directed to a position away from the preferred water flow channel between the water inlet and water outlet of air trap chamber 1050, thereby reducing water flow pressure drop and allowing a larger flow area for debris to traverse.

Each guide rail 1250 can be attached to, or an integral part of, port portion 1200. Each guide rail 1250 can be configured to function even if air trap 1000 is angled from horizontal by approximately 5 degrees to approximately 15 degrees, and/or even if air trap 1000 is angled from vertical by approximately 5 degrees to approximately 15 degrees. Any guide rail 1250 can be an elongate structure having any length that permits them to function as described herein, such as from approximately 0.25 to approximately: 10 inches, e.g., 0.5 inches, 0.75, 1 inch, 1.25 inches, 1.48 inches, 3.14 inches, 5.8 inches, 8 inches, etc.). The longitudinal axis of a guide rail 1250 can be straight and/or curved. The cross-sectional shape of a guide rail 1250 can be any shape, such as any or one more closed polygons, whether regular or irregular, solid or hollow, such as a triangle, quadrilateral, square, pentagon, hexagon, circle, ellipse, annulus, etc., which can transition along the length of a guide rail from one shape to another. The widest cross-sectional dimension of a guide rails 1250 can measure from approximately 0.025 inches to approximately: 2 inches, e.g., 0.125 inches, 0.25 inches, 0.33 inches, 0.5 inches, 0.86 inches, 1 inch, 1.62 inches, etc.

Figure 5:
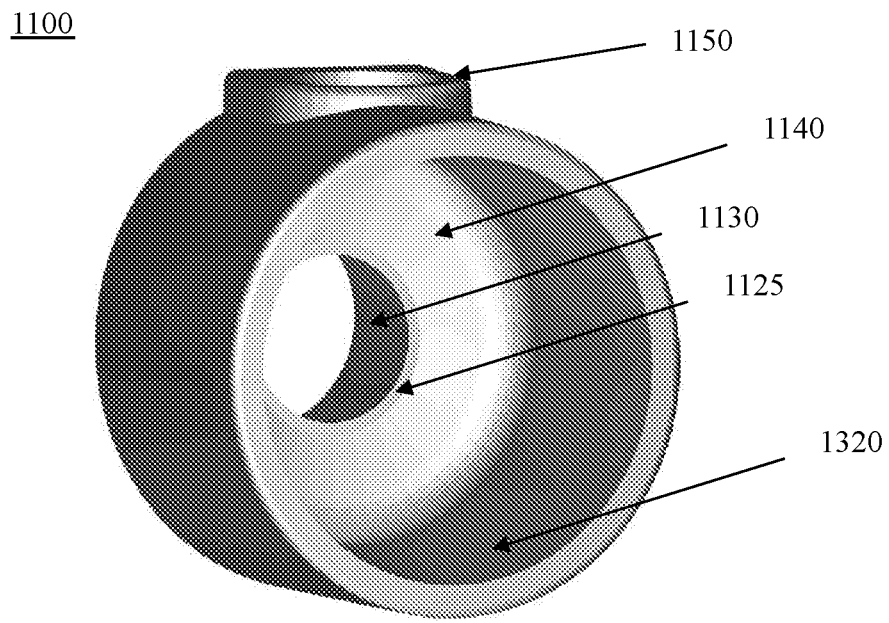
FIG. 5 is a perspective view of an exemplary embodiment of a manufacture.
Figure 6:
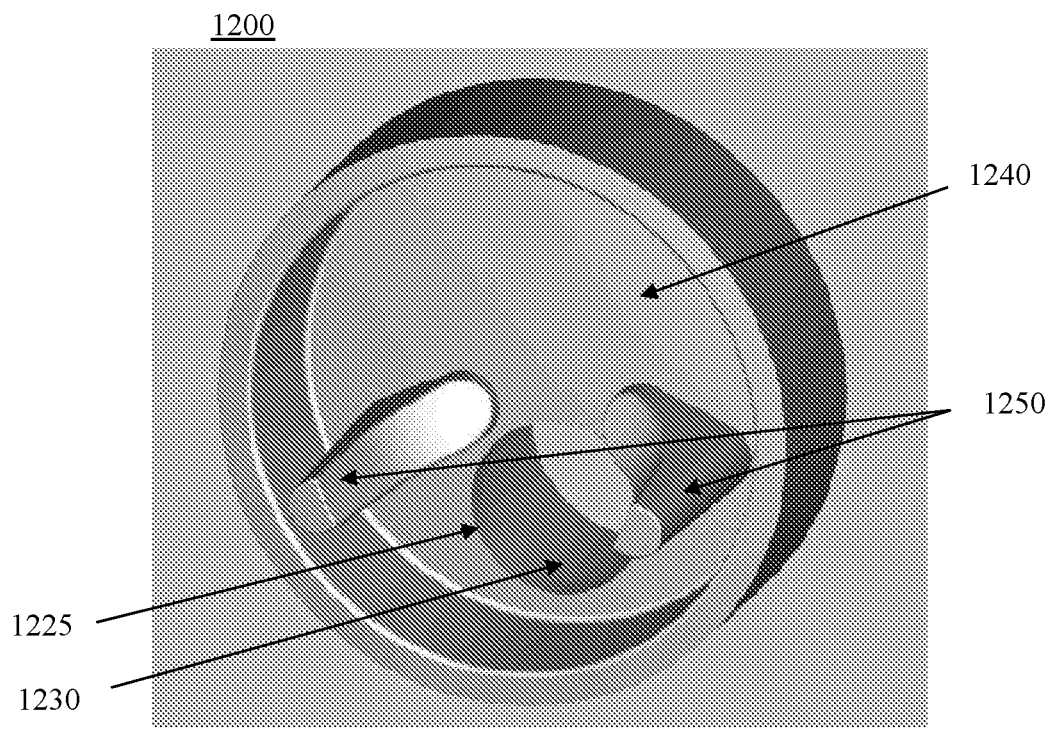
FIG. 6 is a perspective view of an exemplary embodiment of a manufacture.

FIG. 5 provides a perspective view of an exemplary embodiment of seating portion 1100, with seat 1125, seating passage 1130, chamber-facing seating wall surface 1140, clean-out portion 1150, and cylindrical chamber wall 1320 visible. FIG. 6 provides a perspective view of an exemplary embodiment of port portion 1200, with port 1225, port passage 1230, chamber-facing port wall surface 1240, and guide rails 1250 visible.

Figure 7:
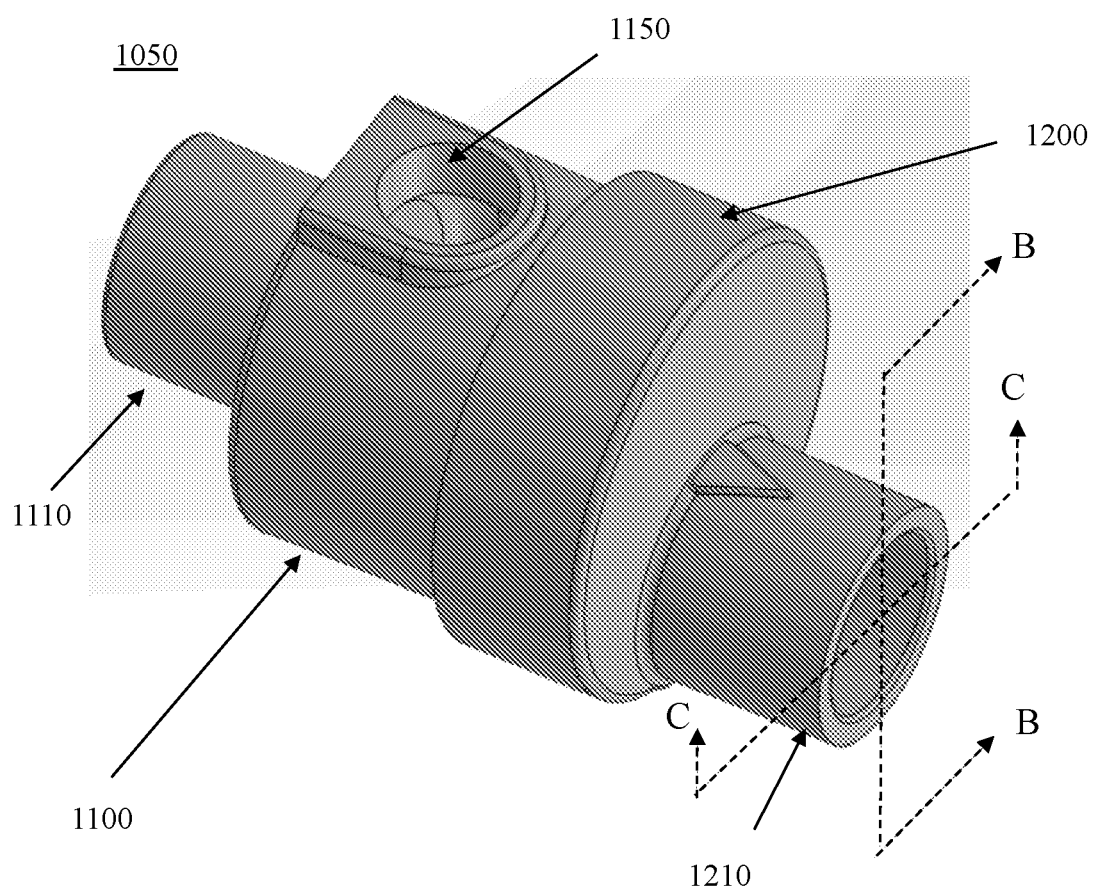
FIG. 7 is a perspective view of an exemplary embodiment of a manufacture.
Figure 8:
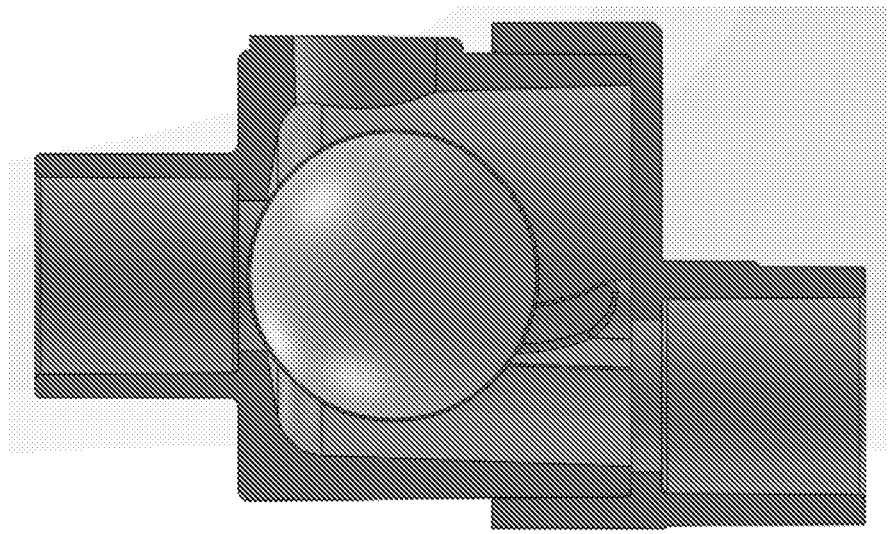
FIG. 8 is a cross-sectional view of an exemplary embodiment of a system.
Figure 9:
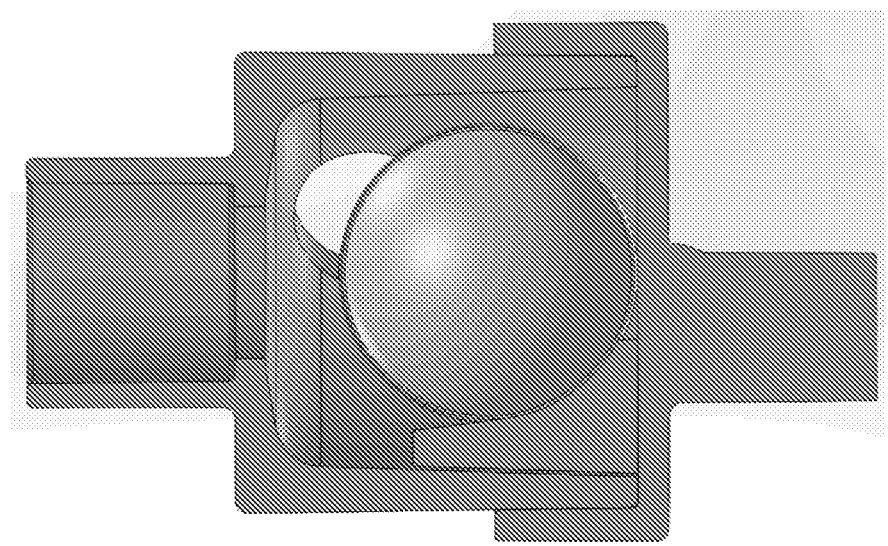
FIG. 9 is a cross-sectional view of an exemplary embodiment of a system.

FIG. 7 provides a perspective view of an exemplary embodiment of trap body 1050, with seat portion 1100, seat pipe mating portion 1110, clean-out portion 1150, port portion 1200, port pipe mating portion 1210 visible. FIG. 8 provides a cross-sectional view of the exemplary embodiment of trap body 1050 taken at section B-B of FIG. 7. FIG. 9 provides a cross-sectional view of the exemplary embodiment of trap body 1050 taken at section C-C of FIG. 7.

Any portion or component of air trap 1000 can be constructed of a polymer, such as a plastic, PVC, ABS, polycarbonate, glycine, etc., rubber, silicone, glass, ceramic, etc. Any portion or component of air trap 1000 can be formed by extrusion, casting, transfer molding, blow-molding, injection-molding, thermosetting, thermoforming, stamping, coating, depositing, curing, vacuum forming, milling, machining, cutting, etching, lithographic printing, joining, 3-D printing, and/or additive manufacturing, etc. Any portion or component of air trap 1000 can have any level of opacity, where a low level of opacity for seating portion 1100 and/or port portion 1200 can allow condensate and/or debris within air trap 1000 to be observed, while a high level of opacity can hide them.

In FIG. 3, with no condensate formed, or in drain line 1500, ball 1400 can draw against seat 1125 due to a negative differential pressure (that differential being the pressure difference between atmospheric pressure in the vicinity of the outside of the trap and the pressure measured at a location just upstream of the seat or just upstream of a location where the condensate is entering the trap from the HVAC unit, that upstream pressure measurement being less than the atmospheric pressure). With ball valve 1400 held against seat 1125 by the negative differential pressure, there can be minimal and/or essentially no airflow. As the condensate begins to flow, the negative differential pressure can continue to hold the ball valve against the seat until the height of the condensate within the vertical drain line, coming from the air handler, reaches a level H, which equals in inches of water the same inches of water column pressure that exists at the entrance to the drain. At this point, the force holding the ball valve against the seat can go to zero (the suction pressure equals the pressure generated by the water column) and the ball valve can be free to move away from the seat (dashed circle in FIG. 3). A pair of guide rails can direct the ball away and upwards from the seat at which point the water flows freely through the air trap.

In the embodiment illustrated in FIG. 3, upon cessation of condensate production, a negative pressure differential can form as the water level in the chamber begins to drop and the ball valve begins to make its way back to the seat. With the air trap being in a horizontal orientation and the guide rails configured to aid in overcoming gravity and viscous forces, the ball can return properly to its seat, even if the air trap is not installed exactly horizontally. After the ball draws fully against the seat, it can take several minutes for the remaining water upstream of the ball to leak past the seated ball and exit the air trap. After these several minutes, there can be no standing water anywhere in the drain line. The design of the air trap can specifically assure that substantially no water stands within the incoming drain line and/or within the housing of the trap. That is, air trap 1000, seating pipe 1120, seating pipe mating portion 1110, trap body 1050, seating portion 1100, port portion 1200, and/or chamber 1300 can be substantially empty of water. Note in FIG. 3 that the internal diameter of seat passage 1130 and/or port passage 1230 can be the same diameter(s) as their corresponding connecting pipes 1120, 1220 when fully assembled resulting in no cavities to hold water and/or debris. In addition, chamber 1300 can be sloped toward port 1225, which can be the lowest point within chamber 1300 and/or the internal volume of the air trap. With no water remaining in the lines or air trap, the air trap can be configured not to freeze and therefore can be configured to not require freeze protection (although there is a rare chance that, for example in a heat recovery application, where exhaust air is cooled by incoming cold air within and air-to-air heat exchanger, condensate could form on the exhaust airside, which could lead to freezing of the drain line if the drain line is exposed to freezing temperatures).

As shown in FIG. 4, the same principles can apply when the air trap operates in the vertical orientation under a positive differential pressure (that differential being the pressure difference between atmospheric pressure in the vicinity of the outside of the trap and the pressure measured at a location just upstream of the seat or just upstream of a location where the condensate is entering the trap from the HVAC unit, that upstream pressure measurement being greater than the atmospheric pressure). With no production of condensate, ball valve 1400 can rest against seat 1125 because of the positive static pressure surrounding the ball and the zero ambient static pressure within the circumference of the seat. Essentially no air can pass through the trap at any time, only water. As water begins to flow into the trap, the buoyancy of the ball valve can overcome the net force pushing down on the ball, causing it to rise off the seat. Water can flow around the ball valve and/or escape through seating passage 1130. Air can remain trapped above the water contained within the chamber. When condensate ceases to form, the water remaining in the chamber can continue to seep between the ball valve 1400 and the seat 1125 and after several minutes, the trap can be essentially free of water. Yet the ball valve can prevent nearly all (e.g., 98%, 99%, 99.5%, 99.9%, 99.99%, etc.) of the air leakage that would otherwise leak from the air handler into the drain piping. With no water present in the trap, there can be essentially no chance of the trap freezing and bursting.

Thus, with certain exemplary embodiments, the air trap can be configured such that whether the air trap is in a substantially horizontal orientation or in a substantially vertical orientation, when there is no condensate production there is substantially no standing water, and when there is condensate production there is only water that is moving through the air trap.

With certain exemplary embodiments, there can be little to no potential for the growth of algae because within the air trap there can be either only transient water or substantially no water, and thus the interior of the air trap and its connecting piping can be essentially algae-free. Regarding debris, most can flow through the air trap with the water flow, but if some buildup does occur there can be a built in clean-out port located near the ball valve seat location that can allow the debris to be removed with, e.g., a water or air purge.

Certain exemplary embodiments can be configured such that there are essentially no pockets, nooks, and/or crannies for debris to accumulate within the air trap. When in horizontal use as a negative pressure trap, the internal flow surfaces can be sloped downward in the direction of water flow such that there need be no standing water when there is no condensate formed. When in use as a positive pressure trap in the vertical positions, the air trap can be configured such that there is no standing water and/or debris is carried downward and through the seat with the water flow. There can be a clean-out port located near the seat to allow air and/or water purge of debris that might collect at the bottom of the trap. The bottom can be sloped toward the seat to encourage discharge of the debris with the water, and thereby substantially minimize the potential for debris accumulation near the seat.

Certain exemplary embodiments can provide a air trap that is configured to allow water to flow from the point of condensate generation within an air conditioning unit, through the air trap, and to a drain, such as a house gutter, a roof drain, and/or a ground level storm drain, while simultaneously not allowing air to flow in or out of the unit. With no condensate generated, the positive pressure across the trap can push the ball valve down and against the periphery of the valve seat. Ambient pressure, at the bottom of the float/ball valve, can assert zero pressure on the ball so the net force pushing the float downward is as follows.

When the ball and/or float diameter and the contact-seat diameter are nearly the same, the pressure force pushing the float against the seat can be high. The following equation determines the net buoyancy force on the float:

Force upward on float=net buoyancy−net pressure force downward=(volume of float×density of water−weight of float)−positive pressure×seat diameter Thus, if the buoyant force is greater than the pressure force then the ball valve can rise from the seat.

For a dry air trap, except for the surface area consisting of the portion of the float circumscribed by the seat diameter, all other pressure-based forces cancel.

$Fpnet=(P1-P2)\times\pi\times(D2)^2/4$

For an air trap with condensate forming and flowing, a buoyant force can come into play because the float can weigh less than the water displaced by its volume. The maximum buoyant force available to counter the downward acting pressure forces can be:

$$Fb\max = \frac{4}{3}\pi\left(\frac{D1}{2}\right)^3 \times \rho water - Wtfloat$$

where pwater is the density of water and
Wtball is the actual weight of the float.
Re-arranging terms:

$(P_1-P_2)\times\pi/4\times D_2{}^2=4/3\times\pi\times(D_1/2)^3\times(\rho water-Wtfloat)$ $D_2{}^2=(4/3\times\pi\times(D_1/2)^3\times(\rho water-Wtfloat)\times 4)/((P_1-P_2)\times\pi)$ $D_2=\{(4/3\times\pi\times(D_1/2)^3\times(\rho water-Wtfloat)\times 4)/((P_1-P_2)\times\pi)\}^{0.5}$ As an example, with a spherical and/or ball-shaped valve/float that has diameter, D1, of approximately 1.575 inches and weighs approximately 0.006 pounds, the buoyant force is approximately 0.07 pounds. With a seat diameter, D2, of approximately 0.8 inches, the net force pushing upward on the ball is approximately 0.03 pounds when the plenum containing the cooling coil drain pain has an approximately 2-inch positive pressure. When the pressure in the drain pan goes to approximately 3.7 inches WC, then the float will not raise from the seat. For the trap to operate at a pressure greater than approximately 3 inches of WC, then one of two parameters can change; either reduce D2 diameter or increase D1 diameter. Normally the float diameter D2 increases. If a design is required that works at 12-inches positive pressure, an air trap can be configured with an approximately 2.5-inch diameter ball and a seat diameter of approximately 0.8 inches.

Figure 10:
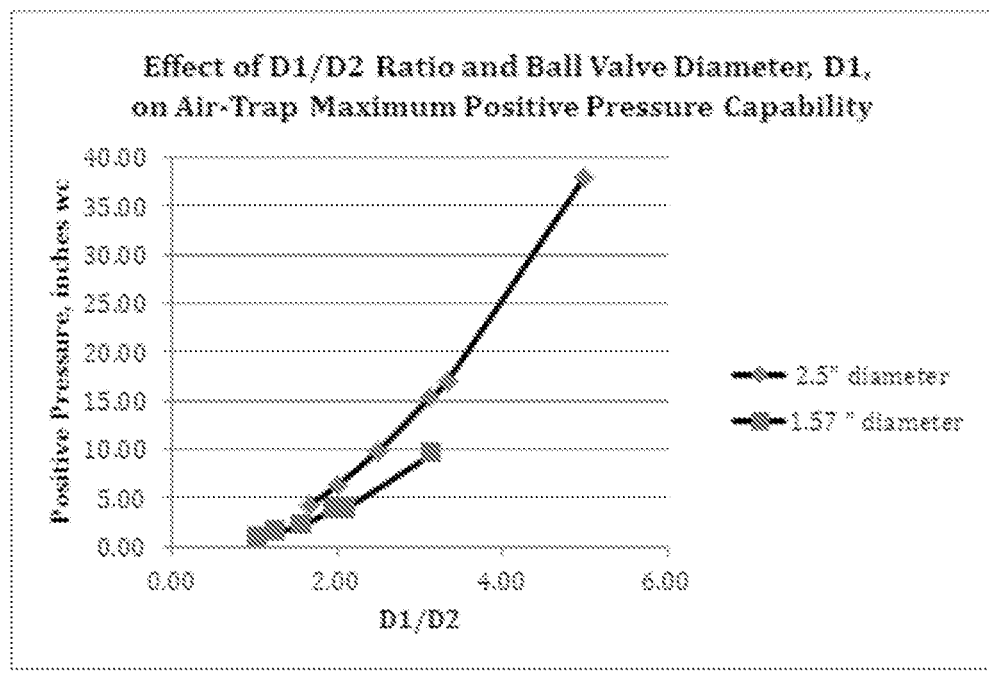
FIG. 10 is a graph showing the effect of D1/D2 ratio and ball valve diameter D1 on the maximum positive pressure capability of an exemplary air trap.

FIG. 10 is a graph plotting the effect of D1/D2 ratio and ball valve diameter D1 on the maximum positive differential pressure capability of an exemplary air trap. As shown, for this exemplary air trap, for a ball diameter of approximately 1.57 inches, a positive differential pressure of approximately 10 inches of water column (approximately 0.36 psi) can be achieved for a D1/D2 ratio of approximately 3. Similarly, for this exemplary air trap, for a ball diameter of approximately 2.5 inches, a positive differential pressure of approximately 37 can be achieved for a D1/D2 ratio of approximately 5.

Selection of the proper distance between the float/ball valve and the inner wall of the chamber can be based on several factors. As an illustration, certain exemplary embodiments can be configured for near zero pressure-drop with a predetermined maximum design water flowing through the air trap. For example, for an air trap in the positive and negative pressure position, the design flow can be approximately 1.6 gallons per minute at approximately ½-inch water column pressure drop.

Another factor can be the debris particle size expected to enter the air trap. The debris that can be expected to accumulate on a cooling coil can be pollen, dust, bugs, and/or insects. An air trap can be configured such that when condensate forms, these particles can flow from the drain pan and then through the air trap.

Yet another factor can be the ball valve diameter necessary to fulfill the sealing and/or buoyancy requirements. Certain exemplary embodiments can be configured for use in residential and/or light commercial applications. In order for the air trap to operate properly in a substantially vertical orientation and/or with positive differential pressure of up to approximately 3½ inches of water column, the ball valve can have a diameter of approximately 1.57 inches. The choice of this ball valve diameter can correspond to a seat diameter of approximately 0.80 inches. Functioning in a horizontal orientation, the air trap can operate at any negative differential pressure at a flow rate of up to approximately 1.6 GPM, which can equate to a latent cooing load of approximately 67 tons (which is the equivalent of about 145 tons of total cooling).

Still another factor can be the alignment of ball valve as it re-seats itself after cessation of condensing. If the distance is too large, then the ball valve can have difficulty in reseating itself when condensate ceases. Another factor can be the minimum chamber diameter that will allow desired water flow and the correct ball valve/seat action. If the distance is too small then the pressure drop can increase and/or the debris might not flow freely through the air trap.

With these factors taken into consideration for certain exemplary embodiments, the average distance between the ball and the inner diameter of the chamber can be chosen to be approximately 0.20 inches. This dimension can result in a water flow area around the ball valve of approximately 1.112 in$^2$, which is larger than the area included within the approximately 0.80-inch diameter of the seat.

Certain exemplary embodiments can provide a device configured to trap air, comprising:
   a spherical float;
   a trap body that defines a chamber that is configured to operably:
      receive condensate from a condensate-producing source;
      release the condensate from the chamber to a drain pipe connected to the device; and/or
      contain the float;
   a stationary and substantially smooth seat defined on a chamber-facing surface of the trap body and configured to operably form a fluidic seal when in contact with an exterior surface of the float;
   a port defined through the trap body; and/or
   one or more guide rails attached to or integral with the trap body and configured to operably direct the float toward the seat when the condensate in the chamber is below a predetermined low level;

wherein:
when the device is oriented such that the condensate operably flows into the device in a substantially vertical direction, the device is configured to operably:
receive the condensate into the chamber through the port;
allow the condensate to exit the chamber through the seat;
drain substantially all of the condensate from the chamber when flow of the condensate into the chamber ceases;
and/or
substantially prevent air from exiting the chamber through the seat; and/or
when the device is oriented such that the condensate operably flows into the device in a substantially horizontal direction, the device is configured to operably:
receive the condensate into the chamber through the seat;
allow the condensate to exit the chamber through the port;
drain substantially all of the condensate from the chamber when flow of the condensate into the chamber ceases;
and/or
substantially prevent the air from exiting the chamber through the seat;
the trap body comprises a seat portion and a port portion, the seat portion configured to operably attach to the port portion to form the chamber;
the trap body comprises a seat portion and a port portion, the seat portion configured to operably attach to the port portion to form the chamber and to define a sloped chamber-facing wall that operably directs condensate toward a chamber exit;
the trap body defines a non-destructively openable and re-closeable clean-out that is configured to operably allow, without disconnecting the device from the drain pipe, a fluidic stream, other than the air, to be directed into the chamber with a sufficient pressure and a sufficient flowrate to remove debris from the chamber;
the one or more guide rails are configured to operably direct the float away from the seat when the condensate in the chamber is above a predetermined high level;
the one or more guide rails are configured to operably prevent the ball from blocking the condensate from flowing from the condensate-producing source into the chamber;
the trap body comprises a seat portion and a port portion, the seat portion configured to permanently mate with the port portion to form the chamber;
the seat is circular or substantially annular;
the chamber is defined by two mating extruded parts;
the chamber is configured to operably prevent debris from being trapped therein;
the trap body defines a seating pipe mating portion that is configured to attach to a seating pipe that is configured to operably convey the condensate;
the trap body defines a port pipe mating portion that is configured to attach to a port pipe or port bushing that is configured to operably convey the condensate.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
above—at a higher level.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
after—following in time and/or subsequent to.
against—in contact with so as to rest and/or press on, so as to come into forcible contact with, and/or contrary to and/or in a direction and/or course opposite to.
air—the earth's atmospheric gas.
air trap—a device configured to use air pressure to seal a passage against the escape of air.
allow—to provide, let do, happen, and/or permit.
along—through, on, beside, over, in line with, and/or parallel to the length and/or direction of; and/or from one end to the other of.
and—in conjuction with.
and/or—either in conjunction with or in alternative to.
annular—shaped like a ring.
any—one, some, every, and/or all without specification.
apparatus—an appliance or device for a particular purpose.
approximately—about and/or nearly the same as.
are—to exist.
around—about, surrounding, and/or on substantially all sides of; and/or approximately.
as long as—if and/or since.
associate—to join, connect together, and/or relate.
at—in, on, and/or near.
at least—not less than, and possibly more than.
attach—to fasten, secure, couple, and/or join.
away—on a path directed from a predetermined location.
axis—a straight line about which a body and/or geometric object rotates and/or can be conceived to rotate and/or a center line to which parts of a structure and/or body can be referred.
ball—a substantially spherical object.
based on—indicating one or more factors that affect a determination, but not necessarily foreclosing additional factors that might affect that determination.
below—beneath; in a lower place; and/or less than.
between—in a separating interval and/or intermediate to.
block—(n) an obstacle and/or the act of blocking; (v) to obstruct, stop and/or or impede the passage of and/or movement through; obstruct, and/or to prevent from happening, succeeding, and/or progressing.
body—a main and/or central part.
by—via and/or with the use and/or help of
can—is capable of, in at least some embodiments.
cause—to bring about, provoke, precipitate, produce, elicit, be the reason for, result in, and/or effect.

cease—to halt and/or stop.
chamber—a substantially enclosed space and/or compartment.
chamber-facing—having a surface that defines, is in contact with, and/or is adjacent to a chamber.
circuit—an electrically conductive pathway and/or a communications connection established across two or more switching devices comprised by a network and between corresponding end systems connected to, but not comprised by the network.
circular—having a cross-section of a circle and/or substantially resembling a round shape.
clean-out—an access for inspecting, reaching, and/or removing obstructions, debris, and/or contaminants; and/or a pipe fitting containing a removable plug that provides access for inspection and/or cleaning of the pipe run.
closable—able to be repeatedly closed.
close—to alter and/or move an object so that an opening and/or or passage is covered and/or obstructed by the object; to shut; and/or to draw and/or bind together.
composition of matter—a combination, reaction product, compound, mixture, formulation, material, and/or composite formed by a human and/or automation from two or more substances and/or elements.
comprising—including but not limited to.
condensate—material derived by a change in physical state from a vapor to a liquid.
configure—to design, arrange, set up, shape, and/or make suitable and/or fit for a specific purpose, function, use, and/or situation.
configured to—having a structure that, during operation, will perform the indicated activity(ies). To the extent relevant to the current application, the use of "configured to" is expressly not intended to invoke 35 U.S.C. § 112(f) for that structure.
connect—to join or fasten together.
contact—to physically touch and/or come together.
containing—including but not limited to.
convert—to transform, adapt, and/or change.
convey—to transmit, transport, guide, and/or carry.
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
coupling—linking in some fashion.
create—to bring into being.
debris—a solid substance and/or the remains of something destroyed, disintegrated, and/or decayed.
define—to establish the meaning, relationship, outline, form, and/or structure of; and/or to precisely and/or distinctly describe and/or specify.
derive—to receive, obtain, and/or produce from a source and/or origin.
determine—to find out, obtain, calculate, decide, deduce, ascertain, and/or come to a decision, typically by investigation, reasoning, and/or calculation.
device—a machine, manufacture, and/or collection thereof.
direct—to point, aim, control, cause, provide instruction to, send toward a place and/or object, and/or cause to move in or follow a predetermined course.
direction—a spatial relation between something and a course along which it points and/or moves; a distance independent relationship between two points in space that specifies the position of either with respect to the other; and/or a relationship by which the alignment and/or orientation of any position with respect to any other position is established.
disconnect—to unattach and/or sever a connection.
drain—(n) a pipe an/or or channel that carries off water, liquid, slurry, waste, sewage, etc.; (v) to empty, cause liquid to go out from, draw off (a liquid) by a gradual process, and/or become empty by the drawing off of liquid.
each—every one of a group considered individually.
effective—sufficient to bring about, provoke, elicit, and/or cause.
embodiment—an implementation, manifestation, and/or concrete representation.
estimate—(n) a calculated value approximating an actual value; (v) to calculate and/or determine approximately and/or tentatively.
exemplary—serving as an example, instance, and/or illustration.
exit—(n) a path, passage, and/or way leading through an opening and away from an interior of a container; (v) to leave, go away, and/or flow out of.
exterior—a region that is outside of a device and/or system.
extrude—to shape (a plastic, for instance) by forcing it through a die.
first—a label for a referenced element in one or more patent claims, but that label does not necessarily imply any type of ordering to how that element (or any other elements of a similar type) is implemented in embodiments of the claimed subject matter.
float—(n) a buoyant object; (v) to cause to and/or to remain suspended within and/or on the surface of a fluid without sinking.
flow—(n) the act of flowing, a continuous transfer, and/or a stream and/or current; (v) to pour forth, issue in a stream, and/or move and/or run smoothly with unbroken continuity, as in the manner characteristic of a fluid.
flowrate—a measure how much flows over a given time period.
fluid—a liquid, slurry, vapor, mist, cloud, plume, and/or foam, etc.
fluidic—relating to a fluid.
for—with a purpose of
from—used to indicate a source, origin, and/or location thereof.
further—in addition.
generate—to create, produce, give rise to, and/or bring into existence.
given—
guide—to direct, steer, and/or exert control and/or influence over; and/or a passive structure configured to direct, resist, and/or prevent the movement of something.
having—including but not limited to.
horizontal—parallel to and/or in the plane of the horizon.
including—including but not limited to.
initialize—to prepare something for use and/or some future event.
install—to connect or set in position and prepare for use.
integral—formed and/or united into another entity.
into—to a condition, state, or form of
is—to exist in actuality.
level—a relative position on a scale and/or a position along a vertical axis indicating height and/or depth.
mating—one of a matched pair.

may—is allowed and/or permitted to, in at least some embodiments.

method—one or more acts that are performed upon subject matter to be transformed to a different state or thing and/or are tied to a particular apparatus, said one or more acts not a fundamental principal and not pre-empting all uses of a fundamental principal.

more—a quantifier meaning greater in size, amount, extent, and/or degree.

near—a distance of less than approximately [X].

no—an absence of and/or lacking any.

non-destructively—of, relating to, or being a process that does not result in damage to the subject material and/or product and/or results in such minimal damage that the subject material and/or product can be re-used for its intended purpose.

one—being and/or amounting to a single unit, individual, and/or entire thing, item, and/or object.

open—(v) to interrupt, to release from a closed and/or fastened position, to remove obstructions from, to clear, and/or to electrically decouple in a manner to create a gap across which electrical energy cannot readily flow; (adj) not substantially obstructed and/or not closed.

openable—able to be opened.

opening—an open space serving as an aperture, passage, or gap, operable—practicable and/or fit, ready, and/or configured to be put into its intended use and/or service.

operably—when operating and/or in effect for its intended use and/or service.

operative—when in operation for its intended use and/or service.

or—a conjunction used to indicate alternatives, typically appearing only before the last item in a group of alternative items.

orient—to position a first object relative to a second object.

other—a different and/or distinct entity and/or not the same as already mentioned and/or implied.

outside—beyond a range, boundary, and/or limit; and/or not within.

part—a component.

per—for each and/or by means of.

pipe—a hollow cylinder and/or tube used to conduct a liquid, gas, and/or finely divided solid.

plurality—the state of being plural and/or more than one.

portion—a part, component, section, percentage, ratio, and/or quantity that is less than a larger whole.

pre-—a prefix that precedes an activity that has occurred beforehand and/or in advance.

predetermine—to determine, decide, and/or establish in advance.

pressure—a measure of force applied uniformly over a surface.

prevent—to hinder, avert, and/or keep from occurring.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

rail—a guide, running surface, bar, and/or member configured for supporting and/or guiding another thing.

range—a measure of an extent of a set of values and/or an amount and/or extent of variation.

ratio—a relationship between two quantities expressed as a quotient of one divided by the other.

receive—to get as a signal, take, acquire, and/or obtain.

recommend—to suggest, praise, commend, and/or endorse.

reduce—to make and/or become lesser and/or smaller.

release—to let go and/or free from something that restrains, binds, fastens, and/or holds back.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

retain—to restrain, keep, and/or hold.

ring—a substantially toroidal object which can be imagined as having been generated by rotating a closed loop (e.g., ellipse, circle, irregular curve, polygon, etc.) about a fixed line external to the loop.

said—when used in a system or device claim, an article indicating a subsequent claim term that has been previously introduced.

seal—(v.) to shut close; to keep close; to make fast; to keep secure; to prevent leakage; (n.) a device configured to shut close; to keep close; to make fast; to keep secure; and/or to prevent leakage.

seat—(n) a sealing, supporting, and/or mating surface; (v) to attach to, seal against, support with, and/or bring firmly into contact with.

second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice or selection from alternatives.

set—a related plurality.

slope—(v) to position at an angle and/or incline with respect to vertical or horizontal; (n) an inclined line, surface, plane, position, and/or direction;

and/or with respect to a first point and a second point that are intersected by a straight line, a ratio of the change in the ordinal value from the first point to the second point, to the change in the abscissal value from the first point to the second point; and/or a measure of a degree of inclination; and/or a rate of change.

smooth—lacking substantial surface irregularities, roughness, and/or projections.

source—a point and/or thing at or from which something originates, springs into being, and/or from which it derives and/or is obtained.

species—a class of individuals and/or objects grouped by virtue of their common attributes and assigned a common name; a division subordinate to a genus.

spherical—having the shape of, or substantially resembling, a sphere.

stationary—substantially fixed with respect to an object of reference.

stop—(n) an obstacle and/or impediment to travel and/or the act of stopping; (v) to interrupt, cease and/or end, and/or to block and/or prevent the flow or passage of.

store—to place, hold, and/or retain data, typically in a memory.

stream—a flow of water and/or other fluid substantially—to a great extent and/or degree.

such that—in a manner that results in.

sufficient—a degree and/or amount necessary to achieve a predetermined result.

support—to bear the weight of, especially from below.

surface—an outer boundary of a body, object, and/or thing and/or any material layer and/or face constituting and/or resembling such a boundary.

system—a collection of mechanisms, devices, machines, articles of manufacture, processes, data, and/or instructions, the collection designed to perform one or more specific functions.

that—used as the subject or object of a relative clause.

therein—within.

through—across, among, between, and/or in one side and out the opposite and/or another side of to—a preposition adapted for use for expressing purpose.

toward—used to indicate a destination and/or in a physical and/or logical direction of.

transform—to change in measurable: form, appearance, nature, and/or character.

transmit—to send as a signal, provide, furnish, and/or supply.

trap—a device configured for sealing a passage against the escape of gases.

treatment—an act, manner, or method of handling and/or dealing with someone and/or something.

two—a cardinal number equal to one plus one.

upon—immediately or very soon after; and/or on the occasion of.

use—to put into service.

vertical—substantially perpendicular to horizontal.

via—by way of and/or utilizing.

volume—a mass and/or a three-dimensional region that an object and/or substance occupies.

wall—a partition, structure, and/or mass that serves to enclose, divide, separate, segregate, define, and/or protect a volume.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

without—not accompanied by.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A device configured to trap air, comprising:
  a spherical float;
  a trap body that defines a chamber that is configured to operably:
    receive condensate from a condensate-producing source;
    release the condensate from the chamber to a drain pipe connected to the device; and
    contain the float;
  a stationary and substantially smooth seat defined on a chamber-facing surface of the trap body and configured to operably form a fluidic seal when in contact with an exterior surface of the float;
  a port defined through the trap body; and
  one or more guide rails attached to or integral with the trap body and configured to operably direct the float toward the seat when the condensate in the chamber is below a first predetermined level;
  wherein:
    when the device is oriented such that the condensate operably flows into the device in a substantially vertical direction, the device is configured to operably:
      receive the condensate into the chamber through the port;
      allow the condensate to exit the chamber through the seat;
      drain substantially all of the condensate from the chamber when flow of the condensate into the chamber ceases; and
      substantially prevent air from exiting the chamber through the seat; and
    when the device is oriented such that the condensate operably flows into the device in a substantially horizontal direction, the device is configured to operably:
      receive the condensate into the chamber through the seat;
      allow the condensate to exit the chamber through the port;
      drain substantially all of the condensate from the chamber when flow of the condensate into the chamber ceases; and
      substantially prevent the air from exiting the chamber through the seat.

2. The device of claim 1, wherein:
  the trap body comprises a seat portion and a port portion, the seat portion configured to operably attach to the port portion to form the chamber.

3. The device of claim 1, wherein:
  the trap body comprises a seat portion and a port portion, the seat portion configured to operably attach to the port portion to form the chamber and to define a sloped chamber-facing wall that operably directs condensate toward a chamber exit.

4. The device of claim 1, wherein:
  the trap body defines a non-destructively openable and re-closeable clean-out that is configured to operably allow, without disconnecting the device from the drain pipe, a fluidic stream, other than the air, to be directed into the chamber with a sufficient pressure and a sufficient flowrate to remove debris from the chamber.

5. The device of claim 1, wherein:
  the one or more guide rails are configured to operably direct the float away from the seat when the condensate in the chamber is above a second predetermined level.

6. The device of claim 1, wherein:
the one or more guide rails are configured to operably prevent the ball from blocking the condensate from flowing from the condensate-producing source into the chamber.

7. The device of claim 1, wherein:
the trap body comprises a seat portion and a port portion, the seat portion configured to mate with the port portion to form the chamber.

8. The device of claim 1, wherein:
the seat is circular or substantially annular.

9. The device of claim 1, wherein:
the chamber is defined by two mating extruded parts.

10. The device of claim 1, wherein:
the chamber is configured to operably prevent debris from being retained therein.

11. The device of claim 1, wherein:
the trap body defines a seating pipe mating portion that is configured to attach to a seating pipe that is configured to operably convey the condensate.

12. The device of claim 1, wherein:
the trap body defines a port pipe mating portion that is configured to attach to a port pipe or a port bushing that is configured to operably convey the condensate.

* * * * *